(12) United States Patent
Mische et al.

(10) Patent No.: US 10,511,186 B1
(45) Date of Patent: Dec. 17, 2019

(54) AUTOMATIC TRANSFER POWER SUPPLY WITH RELAY PROTECTION

(71) Applicant: Amazon Technologies, Inc., Seattle, WA (US)

(72) Inventors: William Mische, Seattle, WA (US); Jared Joseph Lee, Marysville, WA (US); Richard Arvel Stevens, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 244 days.

(21) Appl. No.: 15/611,684

(22) Filed: Jun. 1, 2017

(51) Int. Cl.
*H02J 9/06* (2006.01)
*H01H 47/00* (2006.01)

(52) U.S. Cl.
CPC ........... *H02J 9/061* (2013.01); *H01H 47/002* (2013.01); *H01H 2300/018* (2013.01); *H02J 2009/068* (2013.01)

(58) Field of Classification Search
CPC .. H02J 9/061; H02J 2009/068; H01H 47/002; H01H 2300/018
USPC .......................................................... 307/64
See application file for complete search history.

(56) References Cited

U.S. PATENT DOCUMENTS

| | | | |
|---|---|---|---|
| 6,876,103 B2 | 4/2005 | Radusewicz et al. | |
| 2015/0074431 A1 | 3/2015 | Nguyen | |
| 2015/0123473 A1* | 5/2015 | Braylovskiy | H02J 9/061 307/23 |
| 2015/0234440 A1 | 8/2015 | Gardner et al. | |
| 2018/0026534 A1* | 1/2018 | Turcan | H02M 1/08 323/282 |

OTHER PUBLICATIONS

U.S. Appl. No. 13/528,301, filed Jun. 20, 2012 (Long X. Nguyen et al.).
U.S. Appl. No. 14/083,384, filed Nov. 18, 2013 (Oleg Perevalov et al.).
U.S. Appl. No. 14/572,700, filed Dec. 16, 2014 (Gutierrez et al.).
(Continued)

*Primary Examiner* — Carlos Amaya
(74) *Attorney, Agent, or Firm* — Kilpatrick Townsend & Stockton LLP (57) ABSTRACT

In an automatic transfer power supply with relay protection, multiple electric power sources may be selectively coupled with a switched-mode power supply circuit using multiple corresponding sets of relays. The switched-mode power supply circuit may include one or more switches that operate under the control of a switch controller element to implement the functionality of the switched-mode power supply. To protect the relays during source transfer, a source transfer controller may signal the switch controller element to halt current flow through the switched-mode power supply circuit, and then signal the relays to change state while the current flow is halted, thereby protecting the relays during source transfer. Sparking may be reduced in relays that physically move metal armatures to make and break electrical connections, prolonging relay life and/or reducing relay failures and improving power supply availability.

20 Claims, 6 Drawing Sheets

(56) References Cited

OTHER PUBLICATIONS

U.S. Appl. No. 14/657,811, filed Mar. 13, 2015, Titled: Automatic Transfer Switch With Power Quality Module (Nguyen et al.).

Sărăcin et al., "Experimental study platform of the automatic transfer switch used to power supplies backup," *The 8th International Symposium on Advanced Topics in Electrical Engineering* (May 23-25, 2013), 6 pages.

Wall-mount Transfer Switches. Datasheet [online]. APC by Schnieder Electric [first retrieved on Mar. 13, 2015]. Retrieved from the Internet: <URL: http://www.apc.com/shop/us/en/categories/power-distribution/transfer-switches/wall-mount-transfer-switches/_/N-iwio8h>, 1 page.

Zenith ZTS Series: Low-Voltage Automatic and Manual Transfer Switches. Datasheet [online]. GE Digital Energy, Oct. 2010 [retrieved on Apr. 20, 2017]. Retrieved from the Internet: <URL: http://apps.geindustrial.com/publibrary/checkout/PB-5066?TNR=Brochures%7CPB-5066%>, 8 pages.

\* cited by examiner

AUTOMATIC TRANSFER POWER SUPPLY WITH RELAY PROTECTION

BACKGROUND

Reliable supplies of electric power have become an important aspect of many endeavors, and in some cases it is important to strive for as near to 100% availability as is possible. Examples include facilities supporting human health and safety such as hospitals and air traffic control, as well as core services such as telephone networks, computer data centers and financial exchanges. One technique for achieving high availability of electric power is to maintain access to multiple independent sources of electric power at a facility. For example, a computer data center may contract with multiple independent generators of electric power and have each provider run separate and independent transmission lines to the facility.

As part of managing multiple independent sources of electric power, many sites will configure one source of electric power to be primary and/or active, while other sources are secondary and/or backup. Electrical switching equipment may then be used to switch from the active source to the backup source as needed. However, such switching equipment can itself become a point of failure. In particular, some types of electrical relay components used to make and break electrical connections that are incorporated in switching equipment can be prone to failure, which can undermine even sophisticated high availability arrangements. For example, relays having metal armatures that physically move to make and break the electrical connection can spark while changing state degrading the relay and even causing relay failure. However, such relays may be preferred over alternatives such as solid state relays for other performance characteristics such as low resistance when closed, resulting in low amounts of electrical power being wasted as heat. The tradeoff between high availability and wasted energy can be a significant dilemma for designers of conventional high availability electric power systems.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In accordance with at least one embodiment, an automatic transfer power supply with relay protection is enabled. In the automatic transfer power supply, multiple electric power sources (e.g., from multiple different electric power providers and/or generators) may be selectively coupled with a switched-mode power supply circuit using multiple corresponding sets of relays. The switched-mode power supply circuit may include one or more switches (e.g., a semiconductor switch such as a transistor) that operate under the control of a switch controller element to implement the functionality of the switched-mode power supply (e.g., provision of direct current electric power at pre-determined voltages). To protect the relays during source transfer, a source transfer controller may signal the switch controller element to halt current flow through the switched-mode power supply circuit (e.g., may send the switch controller element a "suspend operation" signal), and then signal the relays to change state while the current flow is halted. In accordance with at least one embodiment, ensuring that the switched-mode power supply circuit is not drawing electric power through the relays protects the relays during source transfer. For example, sparking may be reduced in relays that physically move metal armatures to make and break electrical connections ("metal armature relays"), prolonging relay life and/or reducing relay failures and improving power supply availability.

The source transfer may be initiated when the source transfer controller receives a source transfer signal. The source transfer signal may be generated by a source power quality monitoring module and/or a fault detection module. Alternatively, or in addition, the source transfer signal may be manually generated, for example, by a system administrator. The source transfer controller may wait for various pre-determined amounts of time before and after sending various signals in order to ensure the system has sufficient time to act in response to the signals. For example, after sending the suspend operation signal to the switched-mode power supply circuit, the source transfer controller may wait for a pre-determined amount of time before signaling the relays to change state (e.g., from open to closed or vice versa). Alternatively, or in addition, the source transfer controller may expect a response signal. For example, the source transfer controller may expect an operation suspended signal from the switched-mode power supply circuit indicating that the suspend operation has been successfully completed before signaling the relays to change state. As another example, the source transfer controller may wait a pre-determined amount of time after signaling the relays to change state and/or may expect a state changed signal from a relay controller.

The automatic transfer power supply unit may be an integrated electronic device configured to receive alternating current (AC) and/or direct current (DC) from multiple different sources and to supply AC and/or DC to multiple different electric power consumers. For example, a computer data center may receive AC power from multiple independent providers and route each source of AC power to automatic transfer power supply units in or near computer equipment racks. Each automatic transfer power supply unit may provide DC power to one or more computer servers. In accordance with at least one embodiment, the automatic transfer power supply unit may supply DC power to an energy storage device (e.g., a battery or capacitor), and the energy storage device may provide DC power to one or more computer servers in turn. In this configuration, the energy storage device may compensate for a voltage drop that may occur while operation of the switched-mode power supply circuit is suspended for source transfer.

Figure 1:
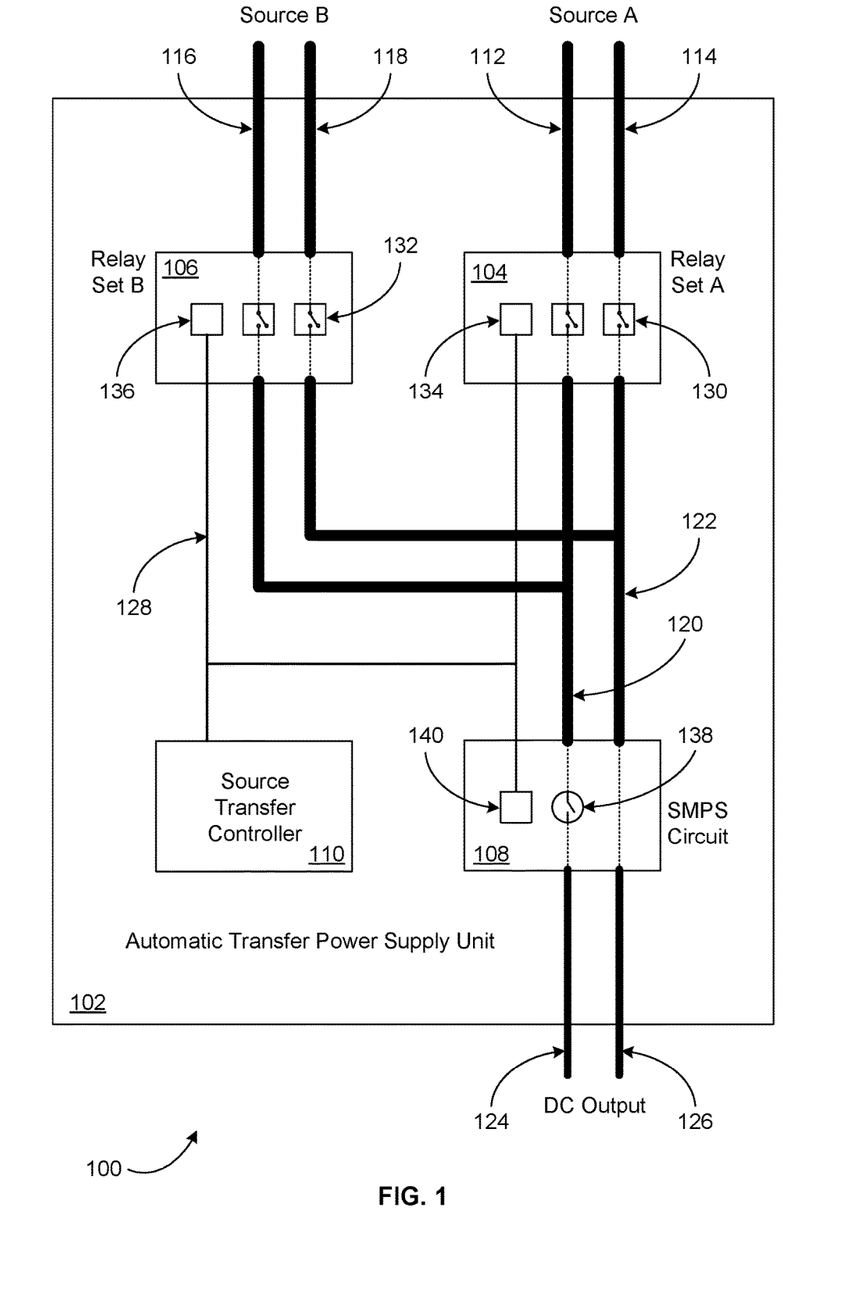
FIG. 1 is a schematic diagram depicting an example automatic transfer power supply unit in accordance with at least one embodiment.

FIG. 1 depicts an example automatic transfer power supply unit 100 in accordance with at least one embodiment. The example automatic transfer power supply unit 100 includes a housing 102 containing two sets of relays (relay set A 104 and relay set B 106) selectively electrically coupling two AC electric power sources with a power supply circuit, in this case a switched-mode power supply (SMPS) circuit 108. The relay sets 104, 106 and the SMPS circuit 108 are under control of a source transfer controller 110. In FIG. 1, thicker lines 112, 114, 116, 118, 120, 122, 124, 126 indicate wiring along which electric power flows to and/or from components 104, 106, 108, while thinner lines 128 indicate wiring along which electronic signaling (typically at lower voltages and/or currents than electric power) flows to and/or from components 104, 106, 108, 110. Although the example automatic transfer power supply unit 100 includes two relay sets 104, 106 receiving electric power from two sources, automatic transfer power supply units in accordance with at least one embodiment may receive any suitable number of electric power sources and include any suitable number of corresponding relay sets. Similarly, automatic transfer power supply units in accordance with at least one embodiment may include any suitable number of SMPS circuits.

In this example 100, the automatic transfer power supply unit 100 receives AC electric power from source A using wires 112 and 114, and AC electric power from source B using wires 116 and 118. The wires 112, 114 from source A are selectively electrically coupled through relay set A 104 using mechanical armature relays, and the wires 116, 118 from source B are selectively electrically coupled through relay set B 106. In FIG. 1, mechanical armature relays are indicated using symbols like 130 and 132. The dashed lines inside the relay sets 104, 106 indicate that the relay set components 104, 106 may have additional wiring and/or subcomponents that are omitted here for clarity. Each relay set 104, 106 includes a corresponding relay controller 134, 136 capable of causing the mechanical armature relays to change state. In this example, the relay sets 104, 106 are maintained in complementary states so that relay set B 106 is closed when relay set A 104 is open and vice versa. Both relay sets 104, 106 are electrically coupled with the SMPS circuit 108 using wires 120 and 122.

In this example, the SMPS circuit 108 receives AC electric power through the wires 120 and 122, and outputs DC electric power using wires 124 and 126. That is, it is an AC to DC type SMPS circuit. However, SMPS circuits in accordance with at least one embodiment may include AC to AC, DC to DC and DC to AC type SMPS circuits given the appropriate input. Alternatively, or in addition, the automatic transfer power supply unit 100 may incorporate multiple SMPS circuits, including circuits of different types, for example, to receive AC main electric supply as "source A" and DC electric supply from batteries and/or solar panels as "source B." The SMPS circuit 108 includes at least one semiconductor switch 138 under control of a switch controller 140. The semiconductor switch 138 is capable of halting current flow through the SMPS circuit 108 such that the SMPS circuit 108 does not draw current through the relay sets 104, 106. An example SMPS circuit 108 in accordance with at least one embodiment is described below in more detail with reference to FIG. 2. The source transfer controller 110 may control the SMPS circuit 108 and the relay sets 104, 106 by sending signals to the relay controllers 134, 136 and the switch controller 140. The signals may correspond to simple voltage levels over wires directly connecting components, or may be encoded and decoded according to any suitable signaling protocol. The source transfer controller 110 may also receive signals from the relay controllers 134, 136 and the switch controller 140, as well as from control sources external to the automatic transfer power supply unit 100. For example, the source transfer controller 110 may receive signals indicating that a source transfer should occur due to a fault condition being detected and/or as instructed by a system administrator (e.g., for maintenance purposes).

Figure 2:
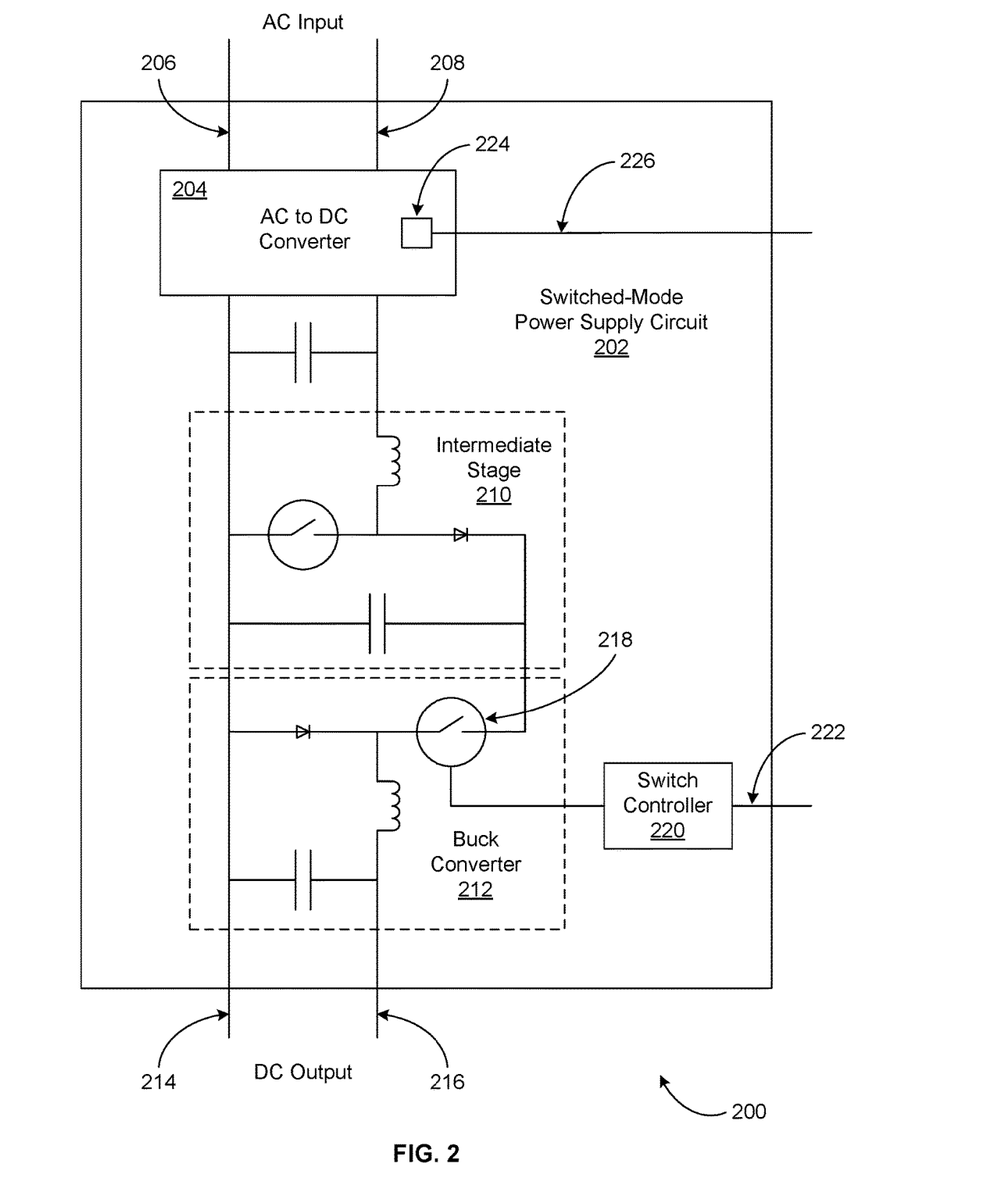
FIG. 2 is a schematic diagram depicting an example switched-mode power supply circuit in accordance with at least one embodiment.

FIG. 2 depicts an example switched-mode power supply circuit 200 in accordance with at least one embodiment. The switched-mode power supply circuit 200 of FIG. 2 is an example of the SMPS circuit 108 of FIG. 1. In this example, the SMPS circuit 200 is arranged in its own block 202 on its own circuit board and/or portion of a circuit board. The AC electric power input is received by an AC to DC converter component 204 using wires 206 and 208 (e.g., corresponding to wires 120 and 122 of FIG. 1). The DC output of the AC to DC converter 204 is passed through an intermediate power conditioning stage 210 (a boost converter in this example) and an output stage 212 (a buck converter in this example) to provide a conditioned DC electric power output on wires 214 and 216. Switched-mode power supply circuits are well known to those of skill in the art, so only some of the details need be described here. Although only one intermediate stage 210 and one output stage 212 is depicted in this example 200, SMPS circuits in accordance with at least one embodiment may include any suitable number and/or type of intermediate stages and/or output stages, including zero. Such stages may have any suitable circuit elements and topologies including buck converters, boost converters, buck-boost converters, flyback converters, forward converters, voltage converters, phase converters, voltage inverters, voltage rectifiers, voltage regulators, voltage transformers, and suitable combinations and variants thereof.

The SMPS circuit 200 may include a semiconductor switch 218 under the control of a switch controller 220. For example, the semiconductor switch 218 may include one or more diodes such as a Schottky diode and/or one or more transistors such as a metal-oxide semiconductor field-effect transistor (MOSFET), and the switch controller 220 may include one or more integrated circuit (IC) chips such as a microcontroller and/or a pulse modulator. In this example 200, the switch controller 220 typically drives the switch 218 with a square wave pulse with a duty cycle corresponding to a voltage transformation by the buck converter 212. In accordance with at least one embodiment, the switch controller 220 is also connected via wire 222 to the source transfer controller 110 of FIG. 1, and the source transfer controller 110 can signal the switch controller 220 to put the switch 218 in the open state for a pre-determined interval of time and/or until instructed otherwise so that electric current substantially stops flowing through the SMPS circuit 200 and the SMPS circuit 200 substantially stops drawing electric power through the relay sets 104, 106. That is, the source transfer controller 110 can send the switch controller 220 suspend operation and resume operation signals. Signal timings are described below in more detail with reference to FIG. 4. The switch controller 220 and the source transfer controller 110 may be implemented at least in part with distinct microcontrollers. Alternatively, switch controller 220 and source transfer controller 110 functionality may be implemented with a single microcontroller. In this example, the AC to DC converter 204 includes a voltage sensing component 224 that may detect fault conditions occurring with respect to the AC input electric power (e.g., the voltage dropping below a pre-determined threshold) and may signal the source transfer controller 110 with respect to such fault conditions over wire 226 (not shown in FIG. 1). Alternatively, or in addition, the voltage sensing component 224 may be part of a power faction correction portion of the SMPS circuit (not shown in FIG. 2). Although many embodiments disclosed herein are described as using an SMPS, further embodiments can use other types of power supplies (e.g., linear power supplies).

Figure 3:
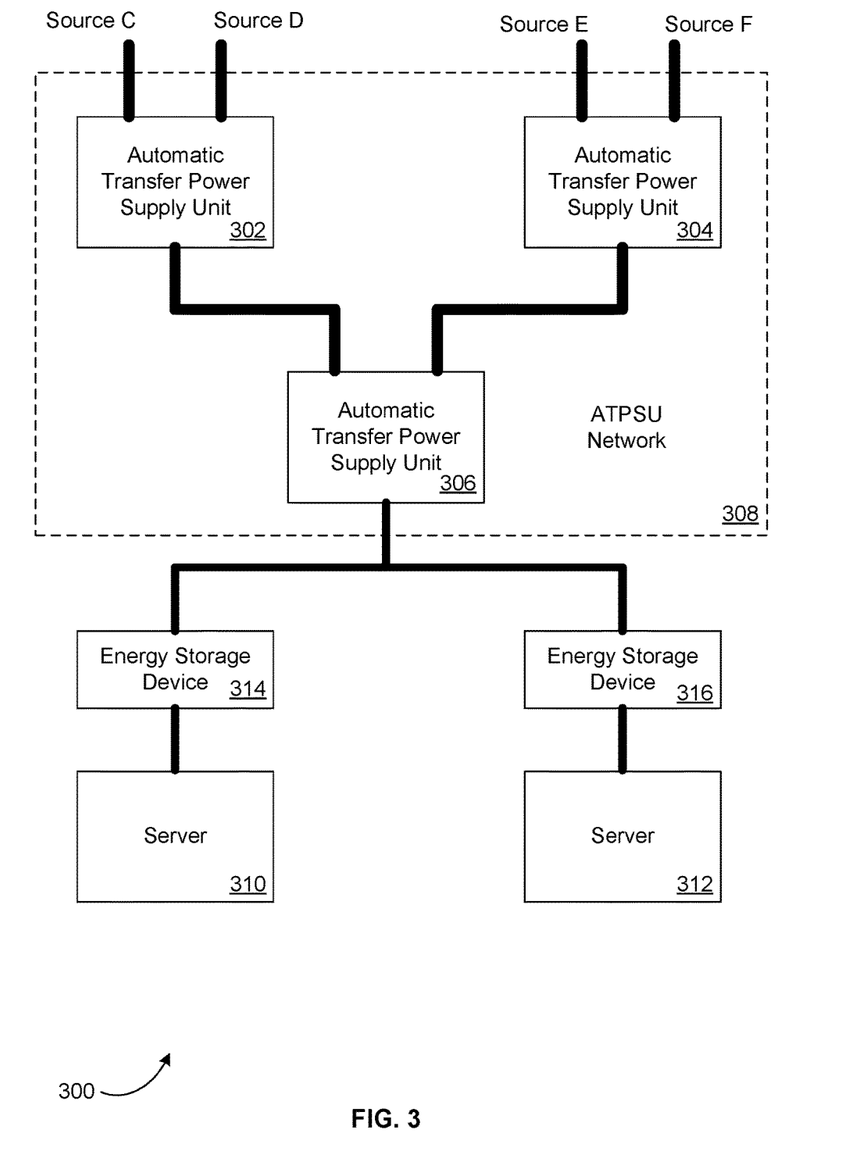
FIG. 3 is a schematic diagram depicting an example power distribution environment in accordance with at least one embodiment.

FIG. 3 depicts an example power distribution environment 300 in accordance with at least one embodiment. In this example, the power distribution environment 300 includes multiple automatic transfer power supply units 302, 304, 306 arranged in a network 308, with two of the automatic transfer power supply units 302, 304 acting as "source A" and "source B" (with reference to FIG. 1) for the third unit 306, while each of the first two units 302, 304 receive electric power from multiple independent sources C and D, and E and F, respectively. In this example, automatic transfer power supply unit 306 supplies DC electric power to two loads, namely, two computer servers 310, 312. Two energy storage devices 314, 316 (e.g., rechargeable batteries and/or capacitors) are arranged between the automatic transfer power supply unit 306 and the computer servers 310, 312 (e.g., in parallel with the automatic transfer power supply unit 306), so that temporary interruptions in DC electric power supply from the automatic transfer power supply unit 306 can be compensated for with supply from the energy storage devices 314, 316. For example, the energy storage devices 314, 316 may maintain power quality during source transfer operations (e.g., at least for a time period on the order of tens of microseconds). In accordance with at least one embodiment, such energy storage devices are optional because source transfer operations require a relatively brief amount of time.

Signaling wires (not shown in FIG. 3) may be run between automatic transfer power supply units 302, 304, 306 in the network 308 to co-ordinate synchronous unit 302, 304, 306 source transfers. Alternatively, or in addition, such signaling wires may be omitted, and each automatic transfer power supply unit 302, 304, 306 may suspend operation according to a coordinated schedule, for example, once per second, once every 10 seconds, or depending on a capability of the energy storage devices 314, 316 to cope with an extended outage in the case of a fault condition (e.g., timed such that there is less than a pre-determined chance, such as a 5% chance, that any interruption extends beyond the capacity of the energy storage devices 314, 316). The scheduled pattern of source transfer opportunities (when the automatic transfer power supply units 302, 304, 306 have suspended operation) need not be regular, for example, the length of the time interval between opportunities may vary.

Figure 4:
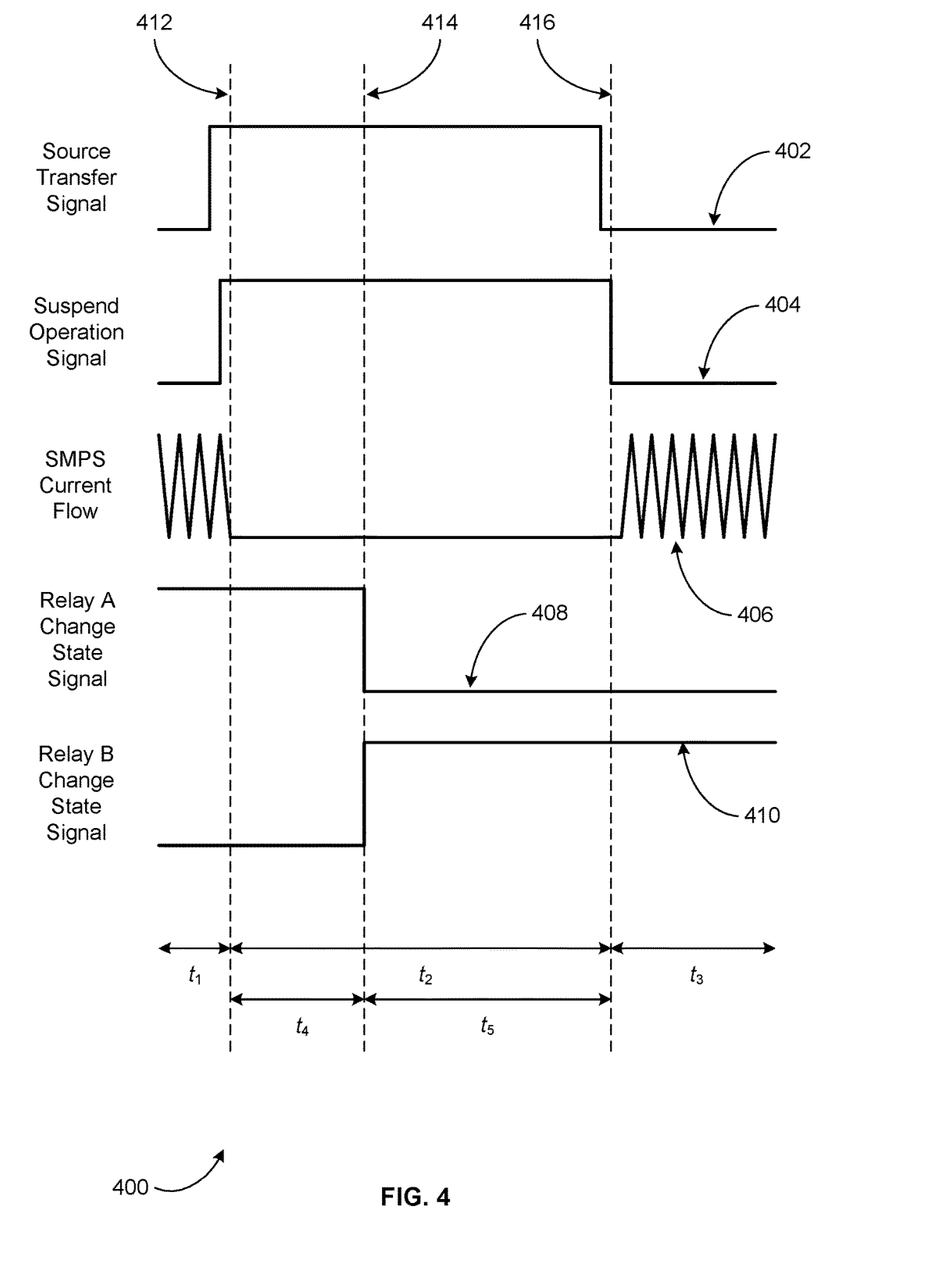
FIG. 4 is a signal timing diagram depicting example signal timings in accordance with at least one embodiment.

FIG. 4 depicts example signal timings 400 in accordance with at least one embodiment. These signals are illustrative of relationships and not to scale. Any suitable signaling scheme may be utilized in accordance with at least one embodiment. A source transfer signal 402 may go from a low voltage to a high voltage indicating that a source transfer should occur, for example, due to a fault condition being detected and/or as an explicit indication by a system administrator. For example, the source transfer signal 402 may be received by the source transfer controller 110 of FIG. 1. In response to the source transfer signal 402, a suspend operation signal 404 may be generated. For example, the suspend operation signal 404 may be generated by the source transfer controller 110 and received by the switch controller 220 of FIG. 2. In response to the suspend operation signal 404, an electric current flow 406 in the SMPS circuit 200 may be suspended. For example, during a time interval $t_1$, the current flow 406 may correspond to and/or approximate a square wave due to conventional control action of the switch controller 220 in the SMPS circuit 200. During a time interval $t_2$, responsive to the suspend operation signal 404, the current flow 406 may drop substantially to zero.

Subsequent to the suspend operation signal 404, relay change state signals 408, 410 may be generated. For example, the source transfer controller 110 of FIG. 1 may generate the relay change state signals 408, 410, and the relay controllers 134, 136, respectively, may receive the relay change state signals 408, 410. Responsive to receiving the relay change state signals 408, 410, the relays may change state. Consequently, the source transfer signal 402 may return to a low voltage, for example, indicating that a fault condition has been resolved by the source transfer. In response, the suspend operation signal 404 may also return to a "resume operation" voltage. For example, this voltage change may correspond to a resume operation signal. In response, the switch controller 220 (FIG. 2) may resume conventional control action, allowing current to flow again in the SMPS circuit 200.

In accordance with at least one embodiment, the time interval $t_2$ corresponds to a time interval during which source transfer with relay protection may occur. In contrast, source transfer during time intervals $t_1$ and $t_3$ risks relay damage and source transfer operation failure. Although the SMPS current flow 406 may be suspended by time 412, the source transfer controller 110 (FIG. 1) may not generate the relay change state signals 408, 410 until time 414. The corresponding time interval $t_4$ may be pre-determined. Alternatively, or in addition, the source transfer controller 110 may wait for an "operation suspended" signal (not shown in FIG. 4) from the switch controller 220 (FIG. 2) indicating that the suspend operation is complete. Similarly, the source transfer controller 110 may wait a pre-determined time interval $t_5$ after the relay state change signal at time 414 before signaling the switch controller 220 to resume operation at time 416. Alternatively, or in addition, the source transfer controller 110 may wait for "relay state changed" signals (not shown in FIG. 4) from the relay controllers 134, 136 indicating that the relay change state operations are complete before signaling the switch controller 220 to resume operation.

Figure 5:
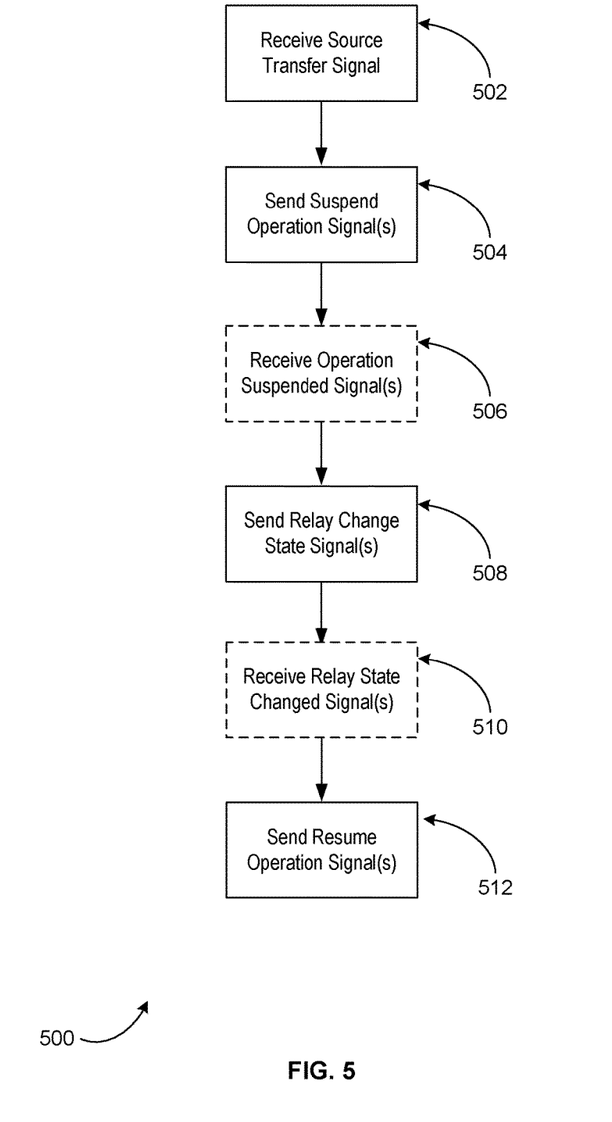
FIG. 5 is a flow diagram depicting example operations of a procedure in accordance with at least one embodiment.

FIG. 5 depicts example operations of a procedure 500 in accordance with at least one embodiment. At 502, a source transfer signal may be received. For example, the source transfer controller 110 (FIG. 1) may receive a source transfer signal from the voltage sensing component 224 (FIG. 2) indicating that a fault condition has occurred and a source transfer is a desirable corrective action. At 504, one or more suspend operation signals may be sent. For example, the source transfer controller 110 may send a suspend operation signal to each SMPS circuit for which it is responsible. At 506, one or more operation suspended signals may be received. For example, the source transfer controller 110 may receive an operation suspended signal in response from each SMPS circuit signaled at 504 (e.g., responsive to detection of a substantially zero current condition by a current sensor in the SMPS circuit). Alternatively, or in addition, the procedure may wait a pre-determined amount of time (e.g., on the order of microseconds) before progressing to 508. At 508, one or more relay change state signals may be sent. For example, the source transfer controller 110 may send a relay change state signal to each relay set 104, 106 for which it is responsible. At 510, one or more relay state changed signals may be received. For example, the source transfer controller 110 may receive a relay state changed signal responsive to each signal sent out at 508. Alternatively, or in addition, the procedure may wait a pre-determined amount of time (e.g., on the order of milliseconds) before progressing to 512. At 512, one or more resume operation signals may be sent. For example, the source transfer controller 110 may send resume operation signals to each SMPS circuit that received a suspend operation signal at 504.

Some or all of the process 500 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 6:
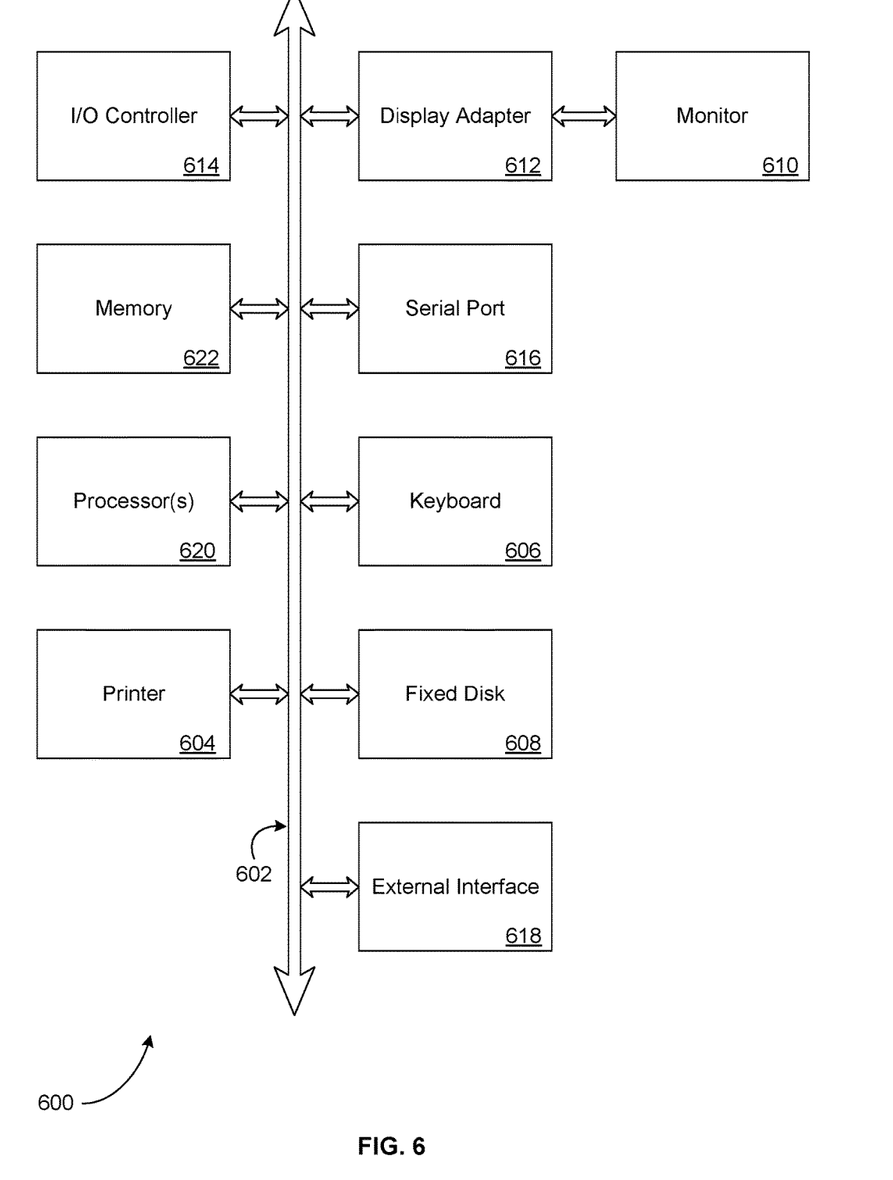
FIG. 6 is a schematic diagram depicting example computer system components in accordance with at least one embodiment.

In accordance with at least some embodiments, the system, apparatus, methods, processes and/or operations for message coding may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 6 depicts aspects of elements that may be present in a computer device and/or system 600 configured to implement a method and/or process in accordance with some embodiments of the present disclosure. The subsystems shown in FIG. 6 are interconnected via a system bus 602. Additional subsystems such as a printer 604, a keyboard 606, a fixed disk 608, a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present disclosure as described herein can be implemented in the form of control logic using computer software in a modular or integrated manner. Alternatively, or in addition, embodiments of the disclosure may be implemented partially or entirely in hardware, for example, with one or more circuits such as electronic circuits, optical circuits, analog circuits, digital circuits, integrated circuits ("IC", sometimes called a "chip") including application-specific ICs ("ASICs") and field-programmable gate arrays ("FPGAs"), and suitable combinations thereof. For example, the source transfer controller 110 described above with reference to FIG. 1 may be partially or entirely implemented in hardware. As will be apparent to one of skill in the art, notions of computational complexity and computational efficiency may be applied mutatis mutandis to circuits and/or circuitry that implement computations and/or algorithms. Based on the disclosure and teachings provided herein, a person of ordinary skill in the art will know and appreciate other ways and/or methods to implement the present embodiments using hardware and/or a combination of hardware and software.

Any of the software components, processes or functions described in this application may be implemented as software code to be executed by a processor using any suitable computer language such as, for example, Java, C++ or Perl using, for example, conventional or object-oriented techniques. For example, the source transfer controller 110 described above with reference to FIG. 1 may be partially or entirely implemented utilizing software code and/or state machines. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An automatic transfer power supply unit, comprising:
   a switched-mode power supply circuit having a semiconductor switch operated by a switch controller;
   a first relay having a first metal armature and a first relay controller, the first relay selectively electrically coupling the switched-mode power supply circuit with a first source of electric power;
   a second relay having a second metal armature and a second relay controller, the second relay selectively electrically coupling the switched-mode power supply circuit with a second source of electric power that is independent of the first source of electric power; and
   a source transfer controller electronically coupled with the switch controller, the first relay controller, and the second relay controller, the source transfer controller configured to:
   receive a source transfer signal indicating that the automatic transfer power supply unit is to transfer from the first source of electric power to the second source of electric power;
   responsive to receiving the source transfer signal, send a suspend operation signal to the switch controller to cause the switch controller to operate the semiconductor switch to prevent the switched-mode power supply circuit from drawing electric current through the first relay or through the second relay during a first time interval;
   after sending the suspend operation signal, causing the first relay to open and the second relay to close during the first time interval; and
   send a resume operation signal to the switch controller element to cause the switch controller element to operate the semiconductor switch such that the switched-mode power supply circuit draws electric current through the second relay during a second time interval that is after the first time interval.

2. An automatic transfer power supply unit in accordance with claim 1, wherein the switched-mode power supply circuit comprises a buck converter implemented with the semiconductor switch and the switch controller.

3. An automatic transfer power supply unit in accordance with claim 1, further comprising a fault detection module configured to send the source transfer signal to the source transfer controller upon detecting a fault condition with respect to the first source of electric power.

4. An automatic transfer power supply unit in accordance with claim 1, wherein the switched-mode power supply circuit provides electric power to a load and to an electrical energy storage device during the second time interval and the electrical energy storage device provides electric power to the load during the first time interval.

5. An apparatus, comprising:
   a power supply circuit having a switch;
   a first relay having a first metal armature and a first relay controller, the first relay selectively electrically coupling the power supply circuit with a first source of electric power;
   a second relay having a second metal armature and a second relay controller, the second relay selectively electrically coupling the power supply circuit with a second source of electric power that is independent of the first source of electric power; and
   a source transfer controller electronically coupled with the switch, the first relay controller, and the second relay controller, the source transfer controller configured to:
   operate the switch such that the power supply circuit reduces the draw of electric current through the first relay during a first time interval; and
   signal the first relay controller to change state during the first time interval.

6. An apparatus in accordance with claim 5, wherein the source transfer controller is further configured to:
   signal the second relay controller to change state during the first time interval; and
   operate the switch such that the power supply circuit draws electric current through the second relay during a second time interval that is after the first time interval.

7. An apparatus in accordance with claim 6, wherein the first relay and the second relay are configured to have complementary states such that, at least outside the first time interval, the second relay is closed when the first relay is open and the first relay is closed when the second relay is open.

8. An apparatus in accordance with claim 5, wherein the first relay is part of a first set of relays and the source transfer controller operates individual relays in the first set of relays such that, at least outside the first time interval, the individual relays in the first set of relays have matching states.

9. An apparatus in accordance with claim 5, wherein the switch is configured to be operated outside the first time interval to implement a power supply function corresponding to a voltage regulator, a voltage rectifier, a voltage inverter, or a voltage transformer.

10. An apparatus in accordance with claim 5, further comprising a switch controller coupled to the switch, wherein the switch controller comprises a microcontroller.

11. An apparatus in accordance with claim 5, wherein the source transfer controller comprises a microcontroller.

12. An apparatus in accordance with claim 5, wherein, after operating the switch, the source transfer controller is further configured to wait for a pre-determined amount of time before signaling the first relay to change state.

13. An apparatus in accordance with claim 12, wherein the pre-determined amount of time corresponds to an amount of time taken by the switch to substantially stop the power supply circuit drawing electric current through the first relay.

14. An apparatus in accordance with claim 5, wherein the source transfer controller is further configured to detect when the power supply circuit is substantially not drawing electric current through the first relay, and to signal the first relay controller to change state in response to the detection.

15. An apparatus in accordance with claim 5, wherein the source transfer controller is further configured to receive an operation suspended signal indicating that the power supply circuit is substantially not drawing electric current through the first relay, and to signal the first relay controller to change state in response to receiving the operation suspended signal.

16. An apparatus in accordance with claim 5, wherein:
the apparatus further comprises a plurality of power supply circuits each having corresponding switches each drawing electric current through the first relay prior to the first time interval; and
the source transfer controller is further configured to operate the corresponding switch such that each of the plurality of power supply circuits substantially stop drawing electric current through the first relay during the first time interval.

17. An apparatus in accordance with claim 5, wherein:
the apparatus further comprises a plurality of automatic transfer switching circuits each having corresponding relays, the plurality of automatic transfer switching circuits arranged in a network and selectively electrically coupling a plurality of sources of electric power with the power supply circuit;
the source transfer controller is further configured to signal the switch controller element to operate the switch such that the power supply circuit substantially does not draw electric current through the relays of the plurality of automatic transfer switching circuits during a pre-determined pattern of time intervals; and
when one or more of the relays are to change state, individual automatic transfer switching circuits of the plurality of automatic transfer switching circuits are configured to cause the corresponding relay to change state during a time interval of the pre-determined pattern of time intervals.

18. A method, comprising:
receiving, by a source transfer controller, an indication to transfer from a first source of electric power to a second source of electric power, the first source of electric power selectively electrically coupled with a power supply circuit by a first relay comprising a first relay controller, the second source of electric power selectively electrically coupled with the power supply circuit by a second relay comprising a second relay controller;
responsive to receiving the indication to transfer, operating, by the source transfer controller, a switch of the power supply circuit to substantially halt a flow of electric current through the power supply circuit during a first time interval;
after operating the switch, signaling, by the source transfer controller, the first relay controller and the second relay controller to change state during the first time interval; and
after signaling the first relay controller and the second relay controller, signaling, by the source transfer controller, the switch controller element of the power supply circuit to operate the switch of the power supply circuit such that the power supply circuit draws electric current through the second relay during a second time interval that is after the first time interval.

19. A method in accordance with claim 18, wherein the source transfer controller operates the switch such that the power supply circuit draws electric current through the second relay at a pre-determined amount of time after signaling the first relay controller and the second relay controller to change state.

20. A method in accordance with claim 18, wherein:
the method further comprises receiving, by the source transfer controller, an indication that the first relay and the second relay have changed state; and
the source transfer controller operates the switch such that the power supply circuit draws electric current through the second relay in response to receiving the indication that the first relay and the second relay have changed state.

* * * * *